United States Patent
Gilmore

(10) Patent No.: US 11,137,177 B1
(45) Date of Patent: Oct. 5, 2021

(54) INTERNAL RETURN PUMP

(71) Applicant: VaporGenics, Inc., Tampa, FL (US)

(72) Inventor: Michael B Gilmore, Tampa, FL (US)

(73) Assignee: VAPORGEMICS, INC, Tampa, FL (US)

(*) Notice: Subject to any disclaimer, the term of this patent is extended or adjusted under 35 U.S.C. 154(b) by 70 days.

(21) Appl. No.: 16/355,724

(22) Filed: Mar. 16, 2019

(51) Int. Cl.
F25B 27/00 (2006.01)
B60H 1/32 (2006.01)
B60H 1/00 (2006.01)

(52) U.S. Cl.
CPC ......... F25B 27/00 (2013.01); B60H 1/00364 (2013.01); B60H 1/3205 (2013.01); B60H 1/3227 (2013.01); B60H 1/3229 (2013.01); B60H 1/3232 (2013.01)

(58) Field of Classification Search
CPC ..... F25B 27/00; B60H 1/3227; B60H 1/3205; B60H 1/00364; B60H 1/3232; B60H 1/3229
USPC ...................................................... 62/238.4
See application file for complete search history.

(56) References Cited

U.S. PATENT DOCUMENTS

| | | |
|---|---|---|
| 1,870,848 A | 8/1932 | Hewitt |
| 3,129,645 A | 4/1964 | Olmsteed |
| 3,662,553 A | 5/1972 | Hodgkinson |
| 3,823,573 A | 7/1974 | Cassady |
| 3,988,901 A | 11/1976 | Shelton et al. |
| 4,018,581 A | 4/1977 | Ruff et al. |
| 4,266,404 A * | 5/1981 | ElDifrawi ................. F02G 5/00 62/79 |
| 4,406,306 A | 9/1983 | Kolze |
| 4,666,373 A | 5/1987 | Sugiura |
| 4,823,560 A | 4/1989 | Rowley et al. |
| 5,129,236 A | 7/1992 | Solomon |
| 5,275,014 A | 1/1994 | Solomon |
| 5,282,366 A | 2/1994 | Reilly et al. |
| 5,365,908 A | 11/1994 | Takii et al. |
| 5,509,274 A | 4/1996 | Lackstrom |
| 5,674,053 A | 10/1997 | Paul et al. |
| 5,725,365 A | 3/1998 | Solomon et al. |
| 6,138,649 A | 10/2000 | Khair et al. |

(Continued)

FOREIGN PATENT DOCUMENTS

| | | |
|---|---|---|
| EP | 1750959 B1 | 9/2009 |
| EP | 2126483 A1 | 12/2009 |

(Continued)

Primary Examiner — Steve S Tanenbaum
(74) Attorney, Agent, or Firm — Frijouf, Rust & Pyle, P.A.

(57) ABSTRACT

An internal return pump is disclosed for a heat engine converting energy from a vapor source to an output device. The heat engine comprises a heat engine body having a sealed first and a second heat engine body end with a heat engine piston is located in the heat engine bore. A heat engine piston rod is connected to the heat engine piston and extending from the second heat engine body end. A first valve and a second valve assembly communicating with the heat engine bore for reciprocating the heat engine piston within the heat engine bore. A condensate pump operated by the heat engine piston rod extending from the second heat engine body end for pumping low pressure vapor to the low pressure vapor return of the vapor source. An output section connecting said heat engine piston rod extending from said second heat engine body end to the output device.

8 Claims, 10 Drawing Sheets

(56) References Cited

U.S. PATENT DOCUMENTS

| | | |
|---|---|---|
| 6,167,703 B1 | 1/2001 | Rumez et al. |
| 6,467,269 B1 | 10/2002 | Dutart |
| 6,532,916 B2 | 3/2003 | Kerrebrock |
| 6,542,875 B1 | 4/2003 | Berlinger et al. |
| 6,546,713 B1 | 4/2003 | Hidaka et al. |
| 6,554,088 B2 | 4/2003 | Severinsky et al. |
| 6,625,978 B1 | 9/2003 | Eriksson et al. |
| 6,651,432 B1 | 11/2003 | Gray, Jr. |
| 6,732,723 B2 | 5/2004 | van Nieuwstadt |
| 6,739,139 B1 | 5/2004 | Solomon |
| 6,896,789 B2 | 5/2005 | Ross |
| 6,915,656 B2 | 7/2005 | Ratliff |
| 7,003,964 B2 | 2/2006 | Solomon |
| 7,207,188 B2 | 4/2007 | Solomon |
| 7,571,699 B2 | 8/2009 | Forner et al. |
| 7,591,143 B2 | 9/2009 | Zeigler et al. |
| 7,591,303 B2 | 9/2009 | Zeigler et al. |
| 7,629,530 B2 | 12/2009 | Inaoka |
| 7,726,129 B2 | 6/2010 | Driver |
| 7,748,226 B2 | 7/2010 | Iwanami et al. |
| 7,765,824 B2 | 8/2010 | Wong et al. |
| 7,891,575 B2 | 2/2011 | Sami |
| 7,975,501 B2 | 7/2011 | Borghi |
| 8,453,722 B2 | 6/2013 | Zeigler et al. |
| 8,522,569 B2 | 9/2013 | Avery et al. |
| 8,544,270 B2 | 10/2013 | Kasuya |
| 8,601,988 B2 | 12/2013 | Graef |
| 8,607,855 B2 | 12/2013 | Feuerecker et al. |
| 2004/0237562 A1 | 12/2004 | Solomon |
| 2006/0117783 A1 | 6/2006 | Solomon |
| 2008/0148731 A1 | 6/2008 | Cao |
| 2009/0000327 A1 | 1/2009 | Burk et al. |
| 2009/0077961 A1 | 3/2009 | Baker |
| 2009/0277152 A1 | 11/2009 | Sutherland |
| 2009/0277400 A1 | 11/2009 | Conry |
| 2009/0301702 A1 | 12/2009 | Zeigler et al. |
| 2010/0101224 A1 | 4/2010 | Kasuya et al. |
| 2010/0156111 A1 | 6/2010 | Pesce et al. |
| 2010/0294217 A1 | 11/2010 | Kasuya et al. |
| 2011/0174006 A1 | 7/2011 | Arendt et al. |
| 2011/0219801 A1 | 9/2011 | McKenzie |
| 2011/0265501 A1 | 11/2011 | Nir |
| 2011/0271674 A1 | 11/2011 | Teng et al. |
| 2011/0296849 A1 | 12/2011 | Benson |
| 2012/0096884 A1 | 4/2012 | Schaefer et al. |
| 2012/0117986 A1 | 5/2012 | Hammond |
| 2012/0180511 A1 | 7/2012 | Pedersen |
| 2012/0198840 A1 | 8/2012 | Stegmaier et al. |
| 2012/0216763 A1 | 8/2012 | Barnes |
| 2012/0247134 A1 | 10/2012 | Gurin |
| 2012/0272643 A1 | 11/2012 | Sherlock |
| 2012/0279243 A1 | 11/2012 | Endo et al. |
| 2012/0291433 A1 | 11/2012 | Meng et al. |
| 2013/0074489 A1 | 3/2013 | Tateno et al. |
| 2013/0091884 A1 | 4/2013 | Hunt et al. |
| 2013/0104546 A1 | 5/2013 | Goswami et al. |
| 2013/0118167 A1 | 5/2013 | Pesce et al. |
| 2013/0125545 A1 | 5/2013 | Geskes et al. |
| 2013/0146000 A1 | 6/2013 | Choi et al. |
| 2013/0255299 A1 | 10/2013 | Hammond |
| 2013/0263619 A1 | 10/2013 | Kapich |
| 2013/0269343 A1 | 10/2013 | Kobylecky et al. |
| 2013/0327042 A1 | 12/2013 | Waterstripe et al. |
| 2014/0020415 A1 | 1/2014 | Heyl |

FOREIGN PATENT DOCUMENTS

| | | |
|---|---|---|
| EP | 1669585 A3 | 4/2010 |
| EP | 2180171 A1 | 4/2010 |
| EP | 1504227 B1 | 5/2010 |
| EP | 1892404 A3 | 3/2011 |
| EP | 2021634 B1 | 12/2012 |
| EP | 1961599 B1 | 7/2013 |
| WO | WO2009119185 A1 | 10/2009 |
| WO | WO2009139926 A1 | 11/2009 |
| WO | WO2008125827 A3 | 12/2009 |
| WO | WO2010006319 A2 | 1/2010 |
| WO | WO2010022184 A2 | 2/2010 |
| WO | WO2010024579 A2 | 3/2010 |
| WO | WO2010027360 A2 | 3/2010 |
| WO | WO2010035927 A1 | 4/2010 |
| WO | WO2010045269 A2 | 4/2010 |
| WO | WO2010067359 A2 | 6/2010 |
| WO | WO2010090456 A2 | 8/2010 |
| WO | WO2010102874 A2 | 9/2010 |
| WO | WO2010149277 A2 | 12/2010 |
| WO | WO2011005673 A1 | 1/2011 |
| WO | WO2011007197 A1 | 1/2011 |
| WO | WO2011017767 A1 | 2/2011 |
| WO | WO2011044262 A2 | 4/2011 |
| WO | WO2011048584 A2 | 4/2011 |
| WO | WO2011053895 A1 | 5/2011 |
| WO | WO2011054383 A1 | 5/2011 |
| WO | WO2011058832 A1 | 5/2011 |
| WO | WO2011066964 A2 | 6/2011 |
| WO | WO2011106859 A1 | 9/2011 |
| WO | WO2011120132 A1 | 10/2011 |
| WO | WO2012016873 A1 | 2/2012 |
| WO | WO2012016873 A1 | 5/2012 |
| WO | WO2012064208 A1 | 5/2012 |
| WO | WO2012078195 A1 | 6/2012 |
| WO | WO2012140575 A2 | 10/2012 |
| WO | WO2012159566 A1 | 11/2012 |
| WO | WO2013103654 A1 | 7/2013 |

\* cited by examiner

INTERNAL RETURN PUMP

BACKGROUND OF THE INVENTION

Field of the Invention

This invention relates to energy transformation and more particularly to a condensate pump for a heat engine converting a heat source into a desired output.

Description of the Related Art

Modern day transportation of goods depends heavily on both rail and trucking systems. The logistics required to maintain the flow of goods ultimately results in long queues. These queues have resulted in long duration idling of locomotives and trucks along major transportation corridors. Additionally, the United States Department of Transportation (DOT) regulations limit the time long haul trucks can be underway each day. This requires daily layovers for each truck. "Sleeper cabs" enable truck drivers to rest in their trucks. However, the trucks engines have been required to idle to allow heater or air conditioning systems to function.

The effect of this long duration engine idling has significant deleterious environmental impact. It has been estimated that long duration idling consumes over 1 billion gallons of diesel fuel annually. This results in 11 million tons of carbon dioxide, 200,000 tons of nitrogen oxides and 5,000 tons of particulate matter. In an effort to curb this pollution, "anti-idling" requirements and legislation have been established, which limit the time engine idling is permitted.

Anti-idling requirements have in turn produced new problems for the transportation industry. Climate control for cab occupants now requires a system external to the vehicle drive engine. Heating is most easily accomplished via a diesel fired heater, while air conditioning presents a far greater and more complicated problem. Some have developed battery powered air conditioning systems. These air conditioning systems require an on board battery bank and an inverter to convert 12 volt DC power to 120 volt AC power. These systems can also run via "shore power". These systems can also be powered via an APU (Auxiliary power unit), which is an onboard diesel generator.

There have been many in the prior art who have attempted to solve these problems with varying degrees of success. None, however completely satisfies the requirements for a complete solution to the aforestated problems. The following U.S. Patents are attempts of the prior art to solve this problem.

U.S. Pat. No. 4,666,373 to Sugiura discloses an impeller for a rotary fluid machine of the centrifugal type which is adapted to be constructed as a liquid pump or gas compressor. The impeller comprises a disc having a boss which is fitted on a drive shaft. A plurality of blades are uniformly spaced apart circumferentially and axially project from at least one side of the disc. Each blade has a front and a rear surface. A fluid path is defined between the front surface of a blade and the rear surface of an adjacent blade. The fluid path is arranged to extend from around the boss to the outer periphery of the disc. The width of the fluid path decreases gradually from around the boss toward the outer periphery of the disc, but the fluid path has a constant depth. The front and the rear surface of each blade are substantially arranged along circular arcs having different radii of curvature which are struck from a common center point. Center points associated with different blades are disposed on a single imaginary circle which is concentric with the disc.

U.S. Pat. No. 5,129,236 to Solomon discloses a heat pump system including a power section having a generator for converting a first working fluid from a liquid to a relatively high pressure gas. A power unit providing energy by the conversion of the relatively high pressure gas to relatively low pressure gas to power a drive piston for intermittently delivering a power stroke. A power section condenser converts the first working fluid from relatively low pressure gas to the liquid. A compressor section is driven intermittently by the drive piston. The compressor section has a compressor for converting a relatively low pressure second working fluid to a relatively high pressure second working fluid for circulating the second working fluid through a compressor section condenser. A compressor section evaporator provides heating and cooling operations. A combined power unit and compressor assembly may be employed which has a valve assembly for introducing the relatively high pressure fluid to power the drive piston and for evacuating the relatively low pressure fluid therefrom. A condensate pump circulates the liquid in the power section.

U.S. Pat. No. 5,275,014 to Solomon discloses a heat pump system including a power section having a generator for converting a first working fluid from a liquid to a relatively high pressure gas. A power unit provides energy by the converting the relatively high pressure gas to a relatively low pressure gas to power a drive piston for intermittently delivering a power stroke. A power section condenser converts the first working fluid from relatively low pressure gas to the liquid. A compressor section is intermittently driven by the drive piston. The compressor section has a compressor converting a relatively low pressure second working fluid to a relatively high pressure second working fluid for circulating the second working fluid through a compressor. A condenser section and a compressor evaporator section provide heating and cooling operations. A combined power unit and compressor assembly may be employed which has a valve assembly for introducing the relatively high pressure gas to power the drive piston and for evacuating the relatively low pressure gas therefrom. A condensate pump circulates the liquid in the power section.

U.S. Pat. No. 5,365,908 to Takii, et al. discloses an internal combustion engine and method for operating the engine wherein a leaner than stoichiometric air/fuel ratio is maintained under all running conditions. The desired torque curve is obtained by increasing the amount of boost generated to the intake air charge without enriching the air/fuel mixture. In addition, an anti-knocking system is incorporated that avoids knocking by retarding the spark advance and, at the same time, providing a leaning in the air/fuel mixture.

U.S. Pat. No. 5,509,274 to Lackstrom discloses a high efficiency heat transfer system including a power circuit and heat pump circuit. Each circuit has a working fluid flowing therein. In the power circuit, a heater vaporizes the working fluid which is periodically delivered and exhausted through a valve assembly to a power unit. The power unit is also a compressor for the working fluid in the heat pump circuit. Fluid exhausted from the driven section of the power unit is passed to a four-way valve which selectively delivers the working fluid to an interior coil or an exterior coil to heat or cool an area. In extremely cold ambient temperatures, the area is heated directly from the power circuit using a by-pass exchanger.

U.S. Pat. No. 5,275,365 to Solomon, et al. discloses a submersible pump cylinder for immersion in and displacement of a fluid. The a submersible pump cylinder includes a cylindrical housing with a plunger assembly positioned for reciprocating motion within the cylindrical housing. A sealing sleeve assembly is attached to the cylindrical housing and to the plunger assembly and overlapped to maintain a convolution which moves during the reciprocating motion of said plunger assembly. A balance valve associated with the plunger assembly maintains pressure within the flexible sleeve, whereby the flexible sleeve is maintained in engagement with the housing and the plunger assembly and substantially without frictional interengagement during motion of the plunger assembly.

U.S. Pat. No. 6,138,649 to Khair, et al. discloses a system for rapidly changing the flow of recirculated exhaust gas to each cylinder of an internal combustion engine operating on diesel fuel or other fuels. The system preferably includes an exhaust gas recirculation line having an exhaust gas recirculation pump along with a reservoir and cooler for storing a desired volume of recirculated exhaust gas. Recirculated exhaust gas is preferably supplied from the reservoir to each cylinder of the associated engine through respective recirculated exhaust gas conduits. A metering valve is preferably disposed within each recirculated exhaust gas conduit immediately adjacent to each cylinder. The metering valves provide uniform distribution of recirculated exhaust gas to the respective cylinders and allow the system to rapidly change the flow of recirculated exhaust gas to each cylinder. The system provides recirculated exhaust gas at a point close to the combustion chamber where it is needed for effective reduction of undesirable emissions.

U.S. Pat. No. 6,167,703 to Rumez, et al. discloses an exhaust gas turbocharger system for an internal combustion engine including a turbine portion with adjustable turbine geometry for powering a compressor portion which delivers a pressurized charge air mass flow to the internal combustion engine air intake. A charge regulator controls the turbine geometry so that the cross-section of exhaust gas flow to the turbine portion is decreased with an increased working load of the internal combustion engine. It is further proposed that at least one heat exchanger is exposed to the charge air circuit so that heated air is fed thereto for heating such as to heat engine lubricating oil.

U.S. Pat. No. 6,467,269 to Dutart discloses a waste gate valve for a turbocharger system in an engine of a work machine, vehicle or the like particularly suitable for operation at changing altitudes. The waste gate valve includes a spring operating against an adjustable spring seat. The adjustable spring seat is adjusted in response to ambient pressure changes to alter the installed length of the spring.

U.S. Pat. No. 6,546,713 to Hidaka, et al. discloses a gas turbine for power generation operated at a turbine nozzle inlet temperature ranging from 1200 to 1650.degree Centigrade. The gas turbine obtains high heat efficiency by making disk blades and nozzles arranged in first to final stages from optimum materials and optimally cooling these disk blades and nozzles, and to obtain a combined power generation system using the gas turbine. The combined power generation system includes a highly efficient gas turbine operated at a turbine nozzle inlet combustion gas temperature ranging from 1200 to 1650 degrees Centigrade. A high pressure-intermediate pressure-low pressure integral type steam turbine is operated at a steam inlet temperature of 530 degree Centigrade or more. The gas turbine is configured such that turbine blades, nozzles and disks are each cooled. The blades and nozzles are each made from a Ni-based alloy having a single crystal or columnar crystal structure and disks are made from a martensite steel.

U.S. Pat. No. 6,554,088 to Severinsky et al. discloses a hybrid vehicle comprising an internal combustion engine, a traction motor, a starter motor, and a battery bank, all controlled by a microprocessor. The microprocessor controls the hybrid vehicle in accordance with the vehicle's instantaneous torque demands so that the engine is run only under conditions of high efficiency. Typically the engine is run only when the load is at least equal to 30% of the engine's maximum torque output. In some embodiments, a turbocharger may be provided, activated only when the load exceeds the engine's maximum torque output for an extended period. A two-speed transmission may further be provided to further broaden the vehicle's load range. A hybrid brake system provides regenerative braking, with mechanical braking available in the event the battery bank is fully charged, in emergencies, or at rest; a control mechanism is provided to control the brake system to provide linear brake feel under varying circumstances.

U.S. Pat. No. 6,625,978 to Eriksson, et al. discloses a device and a method for exhaust gas purification in a combustion engine comprising an arrangement for recirculating exhaust gases from the engine to an air intake thereof. An exhaust gas purification arrangement is adapted to convert constituents in the exhaust gases to less environmentally hazardous substances. A filter arrangement comprises at least one filter adapted to liberate the exhaust gases from particulate constituents. This filter is adapted to purify EGR-exhaust gases only. According to another aspect of the invention, the filter is aged in heat transferring relation to at least one convener unit of the exhaust gas purification arrangement so as to receive from the convener unit a heat addition to promote regeneration of the filter by combustion of particulate constituents deposited therein.

U.S. Pat. No. 6,651,432 to Gray, Jr. discloses a method of operating an internal combustion engine wherein intake ambient air is boosted to a higher pressure by passage through at least one compressor and then introduced into the internal combustion engine. Fuel is also introduced into the internal combustion engine for providing combustion of a mixture with the air charge at a combustion temperature approximating a target value. Various engine operating parameters, inclusive of torque demand, e.g., accelerator pedal depression, are sensed and the boosted pressure is changed in a manner proportional to a change in the sensed torque demand so as to maintain the combustion temperature at approximately the target value, i.e., below 2100.degrees Kelvin.

U.S. Pat. No. 6,732,723 to van Nieuwstadt discloses a method and system for controlling EGR rates of an internal combustion engine including measuring a mass airflow passing to the intake throttle and a desired mass airflow. An error signal is produced representative of a difference between the measured mass airflow and the desired mess airflow. A pair of control signals is produced in response to such produced error signal. One of the pair of control signals is used to adjust the intake throttle to control mass airflow through such intake throttle. The other one of the pair of control signals is used to adjust EGR flow through the EGR valve. The pair of control signals operates the intake throttle and the EGR valve to drive the error signal to a null. In one embodiment, one of the control signals used to adjust the EGR valve is used to provide such adjustment only when the intake throttle is in a position to provide substantially maximum mass airflow through such intake throttle to the intake of the engine. In another embodiment, the pair of control signals operates to drive the throttle to a closed position only when such error signal is unable to be driven towards the null solely from adjustment by the EGR valve.

U.S. Pat. No. 6,739,139 to Solomon discloses a heat pump system including a heat generator. A heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employing compressor working fluid. The compressor has a compressor cylinder chamber, a compressor piston, a compressor piston rod, a spacer separating and joining the heat engine piston rod and the compressor piston rod. A sealing assembly is associated with the spacer separating the heat engine working fluid and the compressor working fluid. A valve assembly communicates with the heat engine cylinder chamber and controls the ingress and egress of heat engine working fluid to the heat engine.

U.S. Pat. No. 6,896,789 to Ross discloses a system for producing one or more gases for enhancing combustion in an internal combustion engine having an intake. The system comprises: an electrolysis cell for generating one or more combustion enhancing gases under pressure. A gas conduit connects the electrolysis cell to the internal combustion engine. A flow regulator is operatively connected between the electrolysis cell and the intake of the engine for regulating a flow of the combustion enhancing gases to the engine.

U.S. Pat. No. 7,003,964 to Solomon discloses a heat pump system including a heat generator. A heat engine is supplied with heat engine working fluid by the heat generator having a heat engine cylinder chamber with a heat engine piston and a heat engine piston rod. A preheating chamber employs the heat engine working fluid to heat the heat engine cylinder chamber. A compressor driven by the heat engine employs compressor working fluid having a compressor cylinder chamber with a compressor piston and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

U.S. Pat. No. 7,207,188 to Solomon discloses a heat pump system including a heat generator. A heat engine is supplied with heat engine working fluid by the heat generator having a heat engine cylinder chamber with a heat engine piston and a heat engine piston rod. A preheating chamber employs the heat engine working fluid to heat the heat engine cylinder chamber. A compressor driven by the heat engine employs compressor working fluid having a compressor cylinder chamber with a compressor piston and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

U.S. Patent Application 2004/0237562 to Solomon discloses a heat pump system including a heat generator. A heat engine is supplied with heat engine working fluid by the heat generator having a heat engine cylinder chamber with a heat engine piston and a heat engine piston rod. A preheating chamber employs the heat engine working fluid to heat the heat engine cylinder chamber. A compressor driven by the heat engine employs compressor working fluid having a compressor cylinder chamber with a compressor piston and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

U.S. Patent Application 2006/0117783 to Solomon discloses a heat pump system including a heat generator. A heat engine is supplied with heat engine working fluid by the heat generator having a heat engine cylinder chamber with a heat engine piston and a heat engine piston rod. A preheating chamber employs the heat engine working fluid to heat the heat engine cylinder chamber. A compressor driven by the heat engine employs compressor working fluid having a compressor cylinder chamber with a compressor piston and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

Various other systems have been developed in an attempt to solve this problem. However, none of these systems of the prior art has been able to completely answer the need to have an "environmentally friendly" air conditioning system which will enable the user to conform to the established anti-idle requirements.

In a prior invention disclosed in U.S. Pat. No. 8,844,291, we set forth a novel universal heat engine for converting energy from a vapor source to an output device.

It is an object of the present invention to improve upon our prior invention by providing an improved condensate pump for the heat engine.

Another object of this invention is to provide an improved condensate pump for a heat engine that is located within and powered by the heat engine.

Another object of this invention is to provide an improved condensate pump for various types of heat engines.

Another object of this invention is to provide an improved condensate pump for a heat engine that eliminates the need for an external low pressure vapor return pump.

Another object of this invention is to provide an improved condensate pump for a heat engine pump that simplifies installation and use.

Another object of this invention is to provide an improved condensate pump for a heat engine pump that is easy to cost effectively produce.

Another object of this invention is to provide an improved condensate pump for a heat engine that is suitable for use in an air conditioning system.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an internal return pump for a heat engine converting energy from a vapor source to an output device. The internal return pump comprises a heat engine body having a sealed first and a second heat engine body end with a heat engine piston located in the heat engine bore.

A heat engine piston rod is connected to the heat engine piston and extending from the second heat engine body end. A first valve and a second valve assembly communicate with the heat engine bore for reciprocating the heat engine piston within the heat engine bore. A condensate pump is operated by the heat engine piston rod extending from the second heat engine body end for pumping low pressure vapor to the low pressure vapor return of the vapor source. An output section connects the heat engine piston rod extending from the second heat engine body end to the output device.

In a more specific example, the condensate pump is interposed between the heat engine and the output device. Preferably, the condensate pump located between the second heat engine body end and the output section.

In another example, the condensate pump has an input vein for channeling low pressure vapor from the first and second valve assemblies into the condensate pump. An output vein directs vapors from the pump to the low pressure vapor return of the vapor source. An input and an output check valve are disposed in the input vein and the output vein for controlling direction of pressure vapors from the first and second valve assemblies to the low pressure vapor return of the vapor source.

In another specific embodiment, the invention is an internal return pump for a heat engine converting energy from a vapor source to an output device. The vapor source has a high pressure vapor supply and a low pressure vapor return. The heat engine section includes a heat engine body extending between a first and a second end and defining a heat engine bore therebetween. A first and a second heat engine body end is secured to the first and a second end of the heat engine body for sealing opposed ends of the heat engine bore. A heat engine piston is located in the heat engine bore. A heat engine piston rod is connected to the heat engine piston. A first valve and a second valve assembly communicate with the heat engine bore for reciprocating the heat engine piston within the heat engine bore. A condensate pump is operated by the heat engine piston rod for pumping low pressure vapor to the low pressure vapor return of the vapor source. An output section includes the heat engine piston rod extending through the second heat engine body end for connection to the output device.

In a more specific example, the condensate pump includes a condensate pump bore extending between a first and a second condensate pump bore end. The condensate pump bore is located within the second heat engine body end. The condensate pump piston is connected to the heat engine piston rod for reciprocating the condensate pump piston within the condensate pump bore upon reciprocation of the heat engine piston rod.

In one example, the output section comprises an output compressor for providing a second differential in temperature and pressure of a second fluid. In a further example, the output section comprises an air conditioning system.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
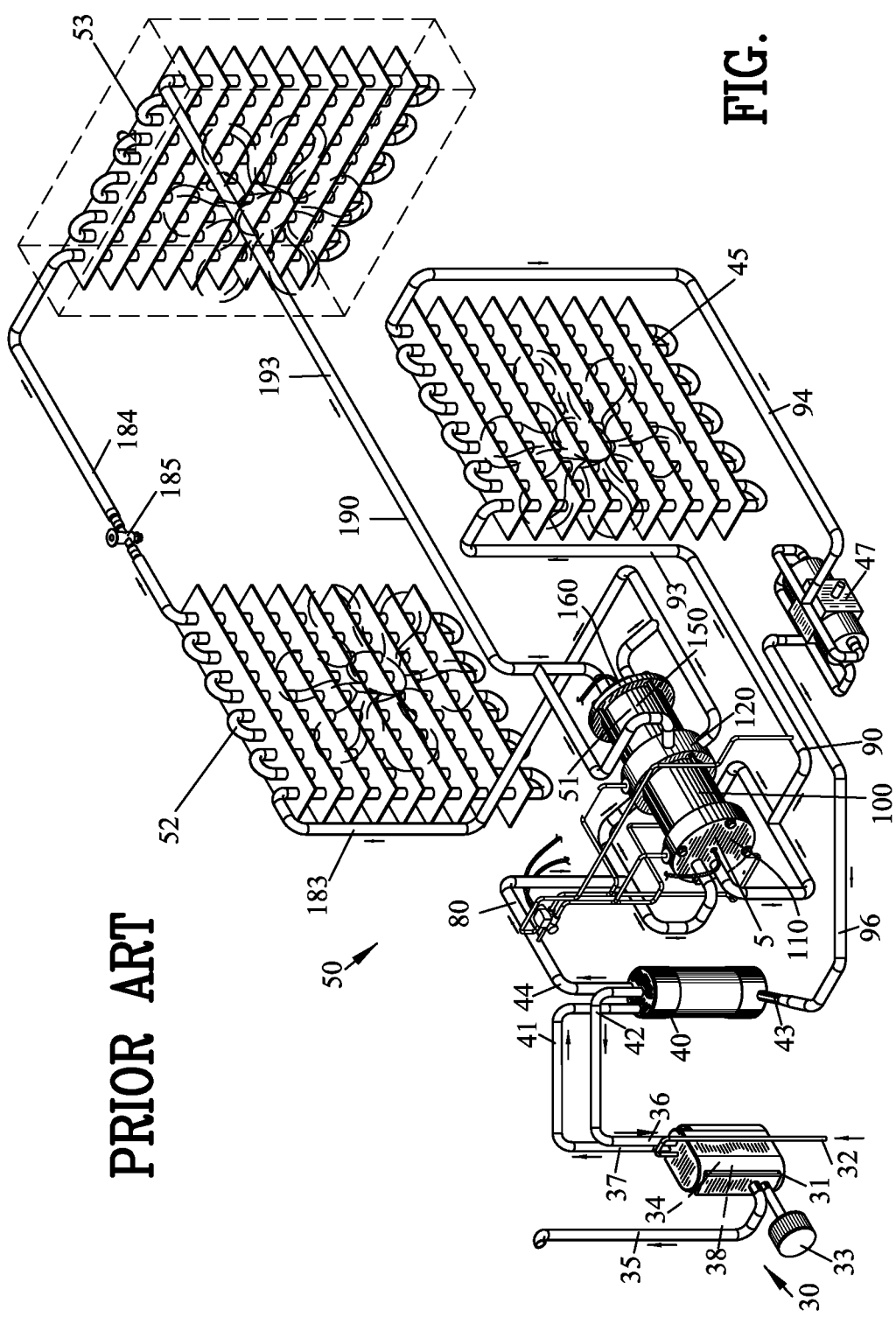
FIG. 1 is a detailed isometric view of a heat engine of the prior art.

FIG. 1 is a detailed isometric view of a heat engine 5 as shown in U.S. Pat. No. 8,844,291. The heat engine 5 converts heat energy into mechanical energy. The heat engine 5 is powered by a heater system 30 connected to heat exchanger 40. In this example, the heat engine 5 is powering an air conditioning system 50. The preferred embodiment set forth in U.S. Pat. No. 8,844,291 shown the heat engine 5 for air conditioning a space 10 such as a vehicle (not shown) when the conventional engine of the vehicle is shut down. It should be understood that the term vehicle as contemplated in this specification as well as in U.S. Pat. No. 8,844,291 includes land vehicles and sea vessels of every description. Furthermore, the systems maybe incorporated in virtually any type of structure lacking a vehicle engine. Such a structure may be static structures including homes, building and the like as well as dynamic structures such as portable offices, shipping containers, refrigerated compartments or the like. In addition, the heat engine 5 may be powered by various sources of heat including solar energy, excess heat energy from petroleum or coal sources, geothermal heat and the like.

The heater system 30 comprises a hydronic heater 31 having a petroleum fuel input 32 and an air input 33. A burner 34 is located within the hydronic heater 31 for burning fuel from the fuel input 32. Vapors from the burnt fuel are expelled through an exhaust 35.

A hydronic heater 31 heats a liquid by burning petroleum fuel. The hydronic heater 31 includes a liquid input 36 and a liquid output 37 with an internal liquid pump 38 located therebetween. The hydronic heater 31 heats a liquid entering the liquid input 36 and discharges in the liquid from the liquid output 37 through the operation of the internal liquid pump 38.

The heater system 30 is connected to a heat exchanger 40 functioning as a vapor generator 40. The liquid input 36 and the liquid output 37 of the hydronic heater 31 are connected to a primary liquid input 41 and a primary liquid output 42 of the vapor generator 40. The heated liquid flowing through the primary liquid input 41 and primary liquid output 42 exchange heat with a fluid flowing between a secondary liquid input 43 and a secondary liquid output 44.

An engine section input system 80 interconnects the vapor generator 40 with the heat engine 5. An engine section output system 90 interconnects the heat engine 5 back to the vapor generator 40 through a heat engine condenser 45 and an external condenser pump 47 separated from the heat engine 5.

The air conditioning system 50 comprises and an air-conditioning compressor 51 connected to an air conditioning output condenser 52 and an air conditioning output evaporator 53. The heat engine 5 powers the air-conditioning compressor 51 as will be described in greater detail hereinafter. A fuller explanation of the operation of FIG. 1 made be found in U.S. Pat. No. 8,844,291 which is incorporated by reference as if fully set forth herein.

Figure 2:
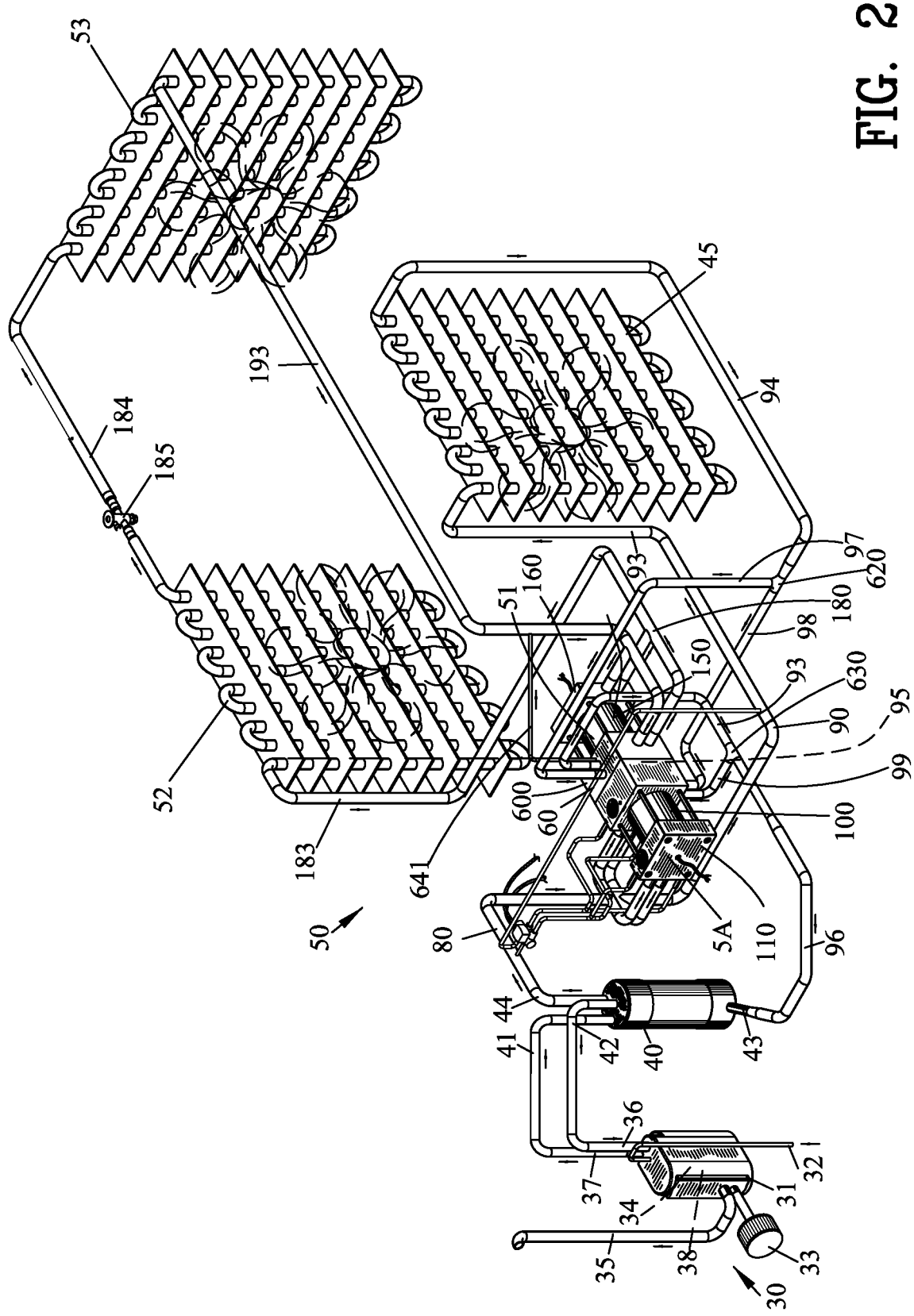
FIG. 2 is a detailed isometric view of a heat engine incorporating the condensate pump of the present invention.

FIG. 2 is a detailed isometric view similar to FIG. 1 with the heat engine 5A modified to include an internal return pump 60. The external condenser pump 47 of FIG. 1 has been eliminated and an internal condensate pump 60 has been incorporated into the heat engine 5A in FIG. 2. The internal condensate pump 60 is powered by the heat engine 5A as will be described in greater detail hereinafter.

Figure 3:
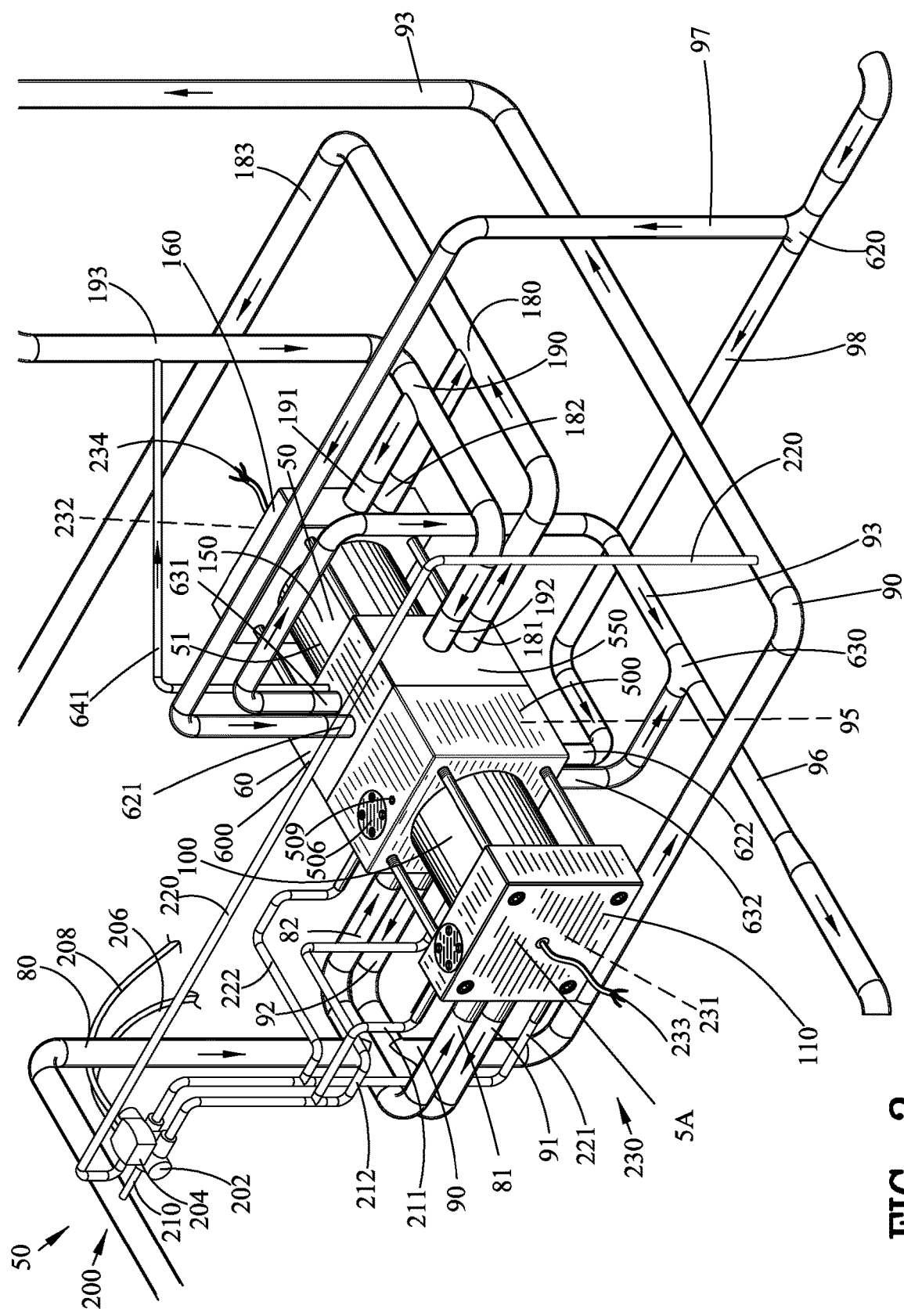
FIG. 3 is an enlarged view of a portion of FIG. 2.
Figure 4:
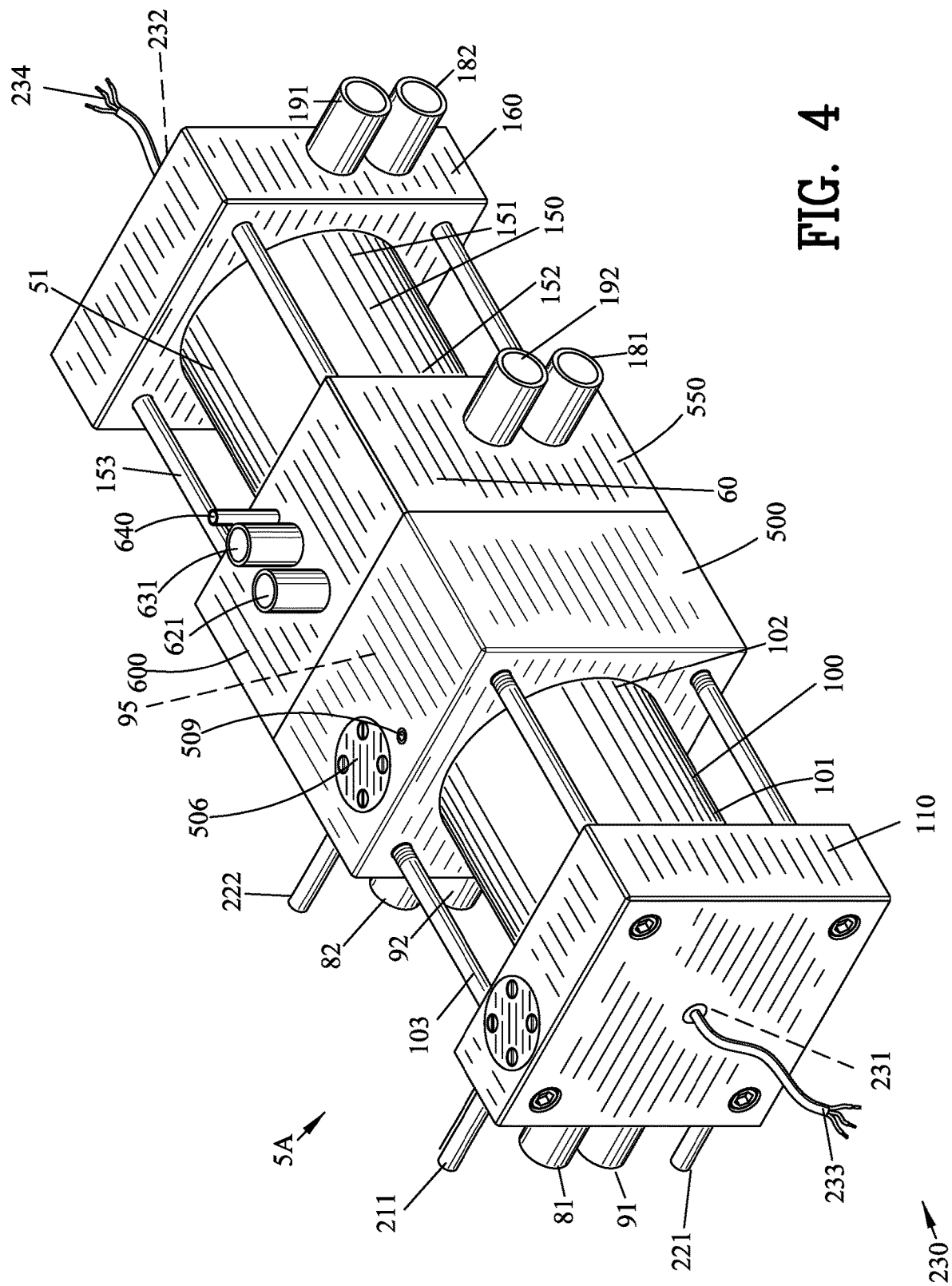
FIG. 4 is an isometric view of the heat engine incorporating the condensate pump of the present invention.
Figure 5:
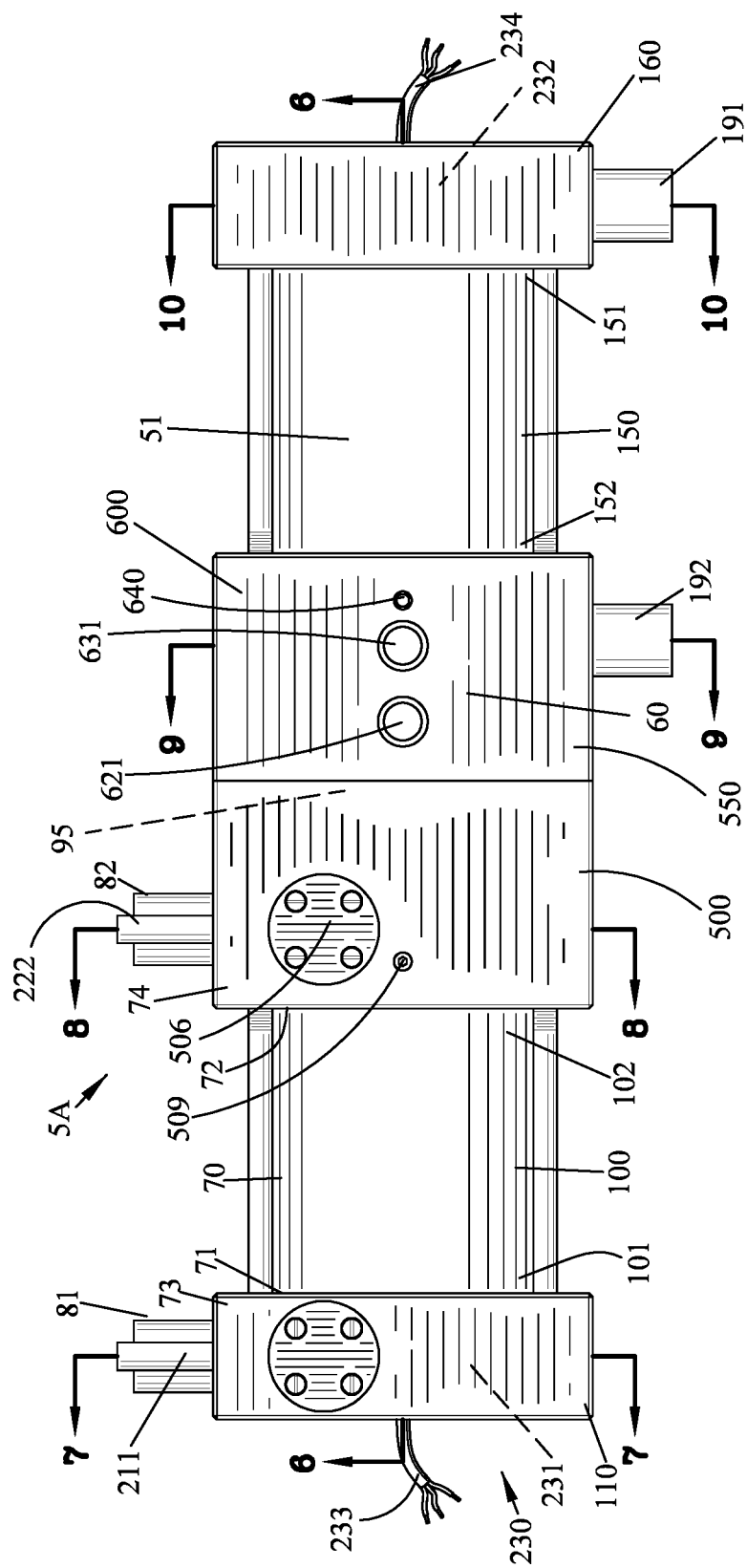
FIG. 5 is a side view of the heat engine of FIG. 4.

FIGS. 3-5 are various views of a portion of FIG. 2 illustrating the heat engine 5A in greater detail. The heat engine 5A comprises an engine input section 100 and an output section 150. The heat engine 5 further comprises valve assemblies including an engine section valve assembly 110, a first and a second central valve assembly 500 and 550, and an output section valve assembly 160.

The engine section input system 80 comprises a first and a second engine section input 81 and 82 connected to the engine section 100 of the beat engine 5A. The first and second engine section input 81 and 82 are connected to the engine valve assembly 110 and the first central valve assembly 500, respectively, of the beat engine 5A. The engine section output system 90 comprises a first and a second engine section output 91 and 92 connected to the heat engine condenser 51 by conduit 93. The first and second engine section output 91 and 92 are connected to the engine valve assembly 110 and the first central valve assembly 500, respectively, of the heat engine 5A. As best shown in FIG. 2, fluid is returned from the heat engine condenser 51 through conduit 94, the internal condensate pump 47 and conduit 96 to the fluid input 43 of the vapor generator 40.

An output section output system 180 comprises a first and a second output section output 181 and 182 connected to the output section 150 of the heat engine 5A. The first and second output section outputs 181 and 182 are connected to the second central valve assembly 550 and the output valve assembly 160, respectively, of the heat engine 5A. The first and second output section outputs 181 and 182 are connected through conduit 183 to the air conditioning output condenser 52 as best shown in FIG. 2. The air conditioning output condenser 52 is connected through conduit 184 to the air conditioning output evaporator 53 as best shown in FIG. 2. A metering device 185 is interposed in conduit 184 between the output condenser 52 and the output evaporator 53.

The output section input system 190 comprises a first and a second output section input 191 and 192 connected to the output section 150 of the heat engine 5A. The first and second output section input 191 and 192 are connected to the output valve assembly 160 and the second central valve assembly 550, respectively, of the heat engine 5A. The first and second output section input 191 and 192 are connected through conduit 193 to the air conditioning output evaporator 53.

A valve actuator system 200 is provided for actuating the heat engine 5A. The valve actuator system 200 comprises a shuttle valve 202 operated by a valve actuator 204. The valve actuator 204 is connected by connectors 206 and 208 to a logic board (not shown). The valve actuator 204 moves the shuttle valve 202 between a first position and a second position as was best described in U.S. Pat. No. 8,844,291. Preferably, the valve actuator 204 is a solenoid operated by the valve control 206.

A high pressure supply line 210 is connected to the engine section input system 80 whereas a low pressure supply line 220 is connected to the engine section output system 90. Supply lines 211 and 212 connect the shuttle valve 202 to the engine valve assembly 110 and the first central valve assembly 500, respectively. Similarly, supply lines 221 and 222 connect the shuttle valve 202 to the engine valve assembly 110 and the first central valve assembly 500, respectively. The shuttle valve 202 provides high and low fluid pressure to supply lines 211 and 221 when the shuttle valve is in the first position and provides low and high fluid pressure to supply lines 211 and 221 when the shuttle valve is in the second position as show in FIGS. 7 and 8.

Figure 6:
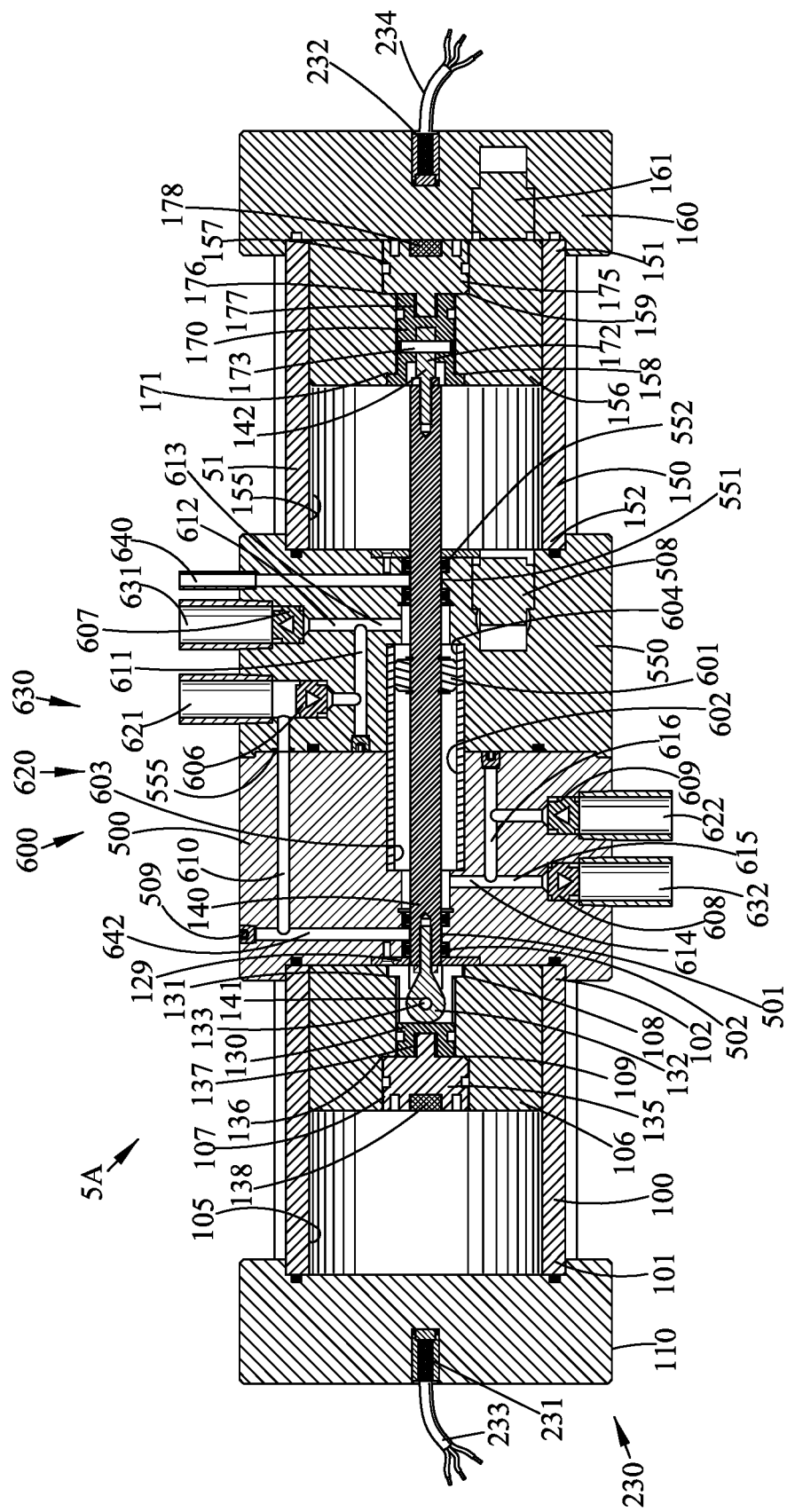
FIG. 6 is a sectional view along line 6-6 in FIG. 5.

FIG. 6 is a side sectional view of the heat engine 5A of FIGS. 2-5. A heat engine body 70 extends between a first and a second end 71 and 72 and defines a heat engine bore 105 between a first and a second heat engine body end 73 and 74. The first and second heat engine body ends 73 and 74 are secured to the first and second ends 71 and 72 of the heat engine body 70 for sealing opposed ends of the heat engine bore 105. The internal return pump 60 comprises an internal condensate pump 600. The internal condensate pump 600 comprises a condensate pump piston 601 located in a condensate pump bore for movement between a condensate pump first bore end 604 and the condensate pump second bore end 605. The condensate pump piston 601 is secure to the connecting rod 140. In this example, the condensate pump piston 601 is secure to the connecting rod 140 by retaining rings engaging with grooves in the connecting rod 140 located on opposed sides of the condensate pump piston 601. However, it should be understood that the condensate pump piston 601 may be secure to the connecting rod 140 by any suitable means.

The internal condensate pump 600 includes an input system 620 having a first and a second condensate pump section input 621 and 622 connected to the second central valve assembly 550 and the first central valve assembly 500, respectively of the heat engine 5A. The condensate pump section output system 630 comprises a first and a second condensate pump section output 631 and 632 connected to the heat exchanger 40 by conduit 96. The first and second condenser pump section output 631 and 632 are connected to the second central valve assembly 550 and the first central valve assembly 500, respectively, of the heat engine 5A.

The engine section 100 of the heat engine 5A extends between a distal end 101 and a proximal end 102. The distal end 101 is sealed to the engine valve assembly 110. The proximal end 102 is sealed to the first central valve assembly 500. The engine section 100 is secured to the engine valve assembly 110 and the first central valve assembly 500 by fasteners 103 threaded into the first central valve assembly 500. The engine section 100 defines a bore 105. An engine piston 106 is located within the bore 105 for reciprocal movement therein. The engine piston 106 includes a through aperture 107 defining shoulders 108 and 109.

The output section 150 of the heat engine 5A extends between a distal end 151 and a proximal end 152. The distal end 151 is sealed to the output section about assembly 160 whereas the proximal end 152 is sealed to the second central valve assembly 550. The output section 150 is secured to the output section valve assembly 160 and the second central valve assembly 550 by fasteners 153 threaded into the second central valve assembly 550.

The first central valve assembly 500 is secured to the second central valve assembly 550 by suitable means. In this example, the first central valve assembly 500 is secured to the second central valve assembly 550 by threaded fasteners (not shown) extending through the first and second central valve assembly 500 and 550 and engaging with apertures 560 in FIG. 9.

The output section 150 defines a bore 155 with an output piston 156 located within the bore 155 for reciprocal movement therein. The output piston 156 includes a through aperture 157 defining shoulders 158 and 159. A connecting rod 140 interconnects the engine piston 106 to the output piston 156 through an engine coupling 130 and an output coupling 170. The connecting rod 140 includes an engine spherical bearing 141 and an output spherical bearing 142. The connecting rod 140 extends through a central aperture 501 and through 551 in the first central valve assembly 500 and the second valve assemble 550, respectively. A seal 502 is provided for sealing the engine bore 105 from the first central valve assembly 500. A seal 552 is provided for sealing the output bore 155 from the second central valve assembly 550. The shaft 140 may be coated with a resilience polymeric material such as Teflon or the like.

The engine coupling 130 including a coupling shoulder 131 is received within the aperture 107 of the piston 106 with a coupling shoulder 131 engaging with the shoulder 108 of the piston 106. The engine coupling 130 defines a bearing receiver 132 for receiving the spherical bearing 141 of the connecting rod 140. A bearing pin 133 secures the spherical bearing 141 to the engine coupling 130. It should be understood at the bearing pin 133 secures the spherical bearing 141 to the engine coupling 130 prior to the engine coupling 130 being inserted within the aperture 107 of the engine piston 106.

An engine retainer 135 is inserted from the opposite side of the engine piston 106 with an engine retainer shoulder 136 engaging with the shoulder 109 of the engine piston 106. The engine retainer 135 is secured to the engine coupling 130 through a threaded engagement 137. The threaded engagement 137 ensures that the engine coupling 130 and the engine retainer 135 are fixed to the engine piston 106. The engine retainer 135 supports a magnet 138 for cooperating with the sensor 231 for sensing the position of the engine piston 106 within the engine bore 105.

The output coupling 170 including a coupling shoulder 171 is received within the aperture 157 of the piston 156 with a coupling shoulder 171 engaging with the shoulder 158 of the piston 156. The output coupling 170 defines a bearing receiver 172 for receiving the spherical bearing 142 of the connecting rod 140. A bearing pin 173 secures the spherical bearing 142 to the output coupling 170.

An output retainer 175 is inserted from the opposite side of the output piston 156 with an output retainer shoulder 176 engaging with the shoulder 159 of the output piston 156. The output retainer 175 is secured to the output coupling 170 through a threaded engagement 177. The threaded engagement 177 ensures that the output coupling 170 and the output retainer 175 are fixed to the output piston 156. The output retainer 175 supports a magnet 178 for cooperating with the sensor 232 for sensing the position of the output piston 156 within the output bore 155.

Figure 7:
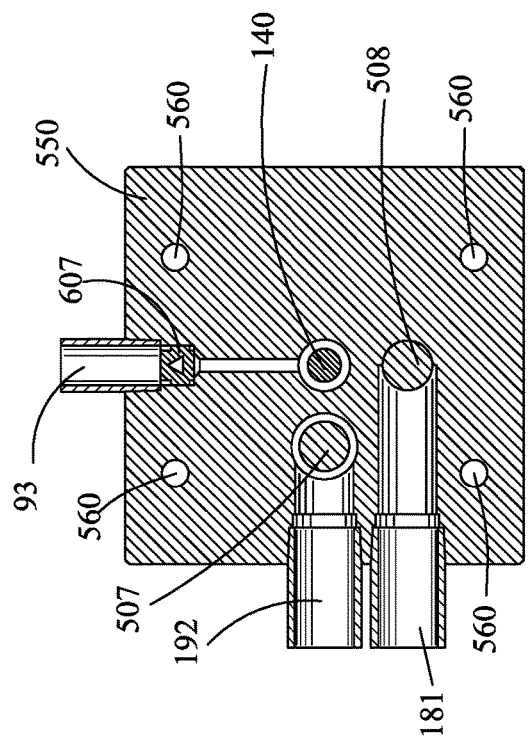
FIG. 7 is a sectional view along line 7-7 in FIG. 5.

The engine piston 106 and the output piston 156 are disposed in the maximum right position. Fluid pressure of the first fluid from supply line 211, shown in FIG. 7, is applied to move the shuttle valve 114 into the bottom position in FIG. 7.

Figure 8:
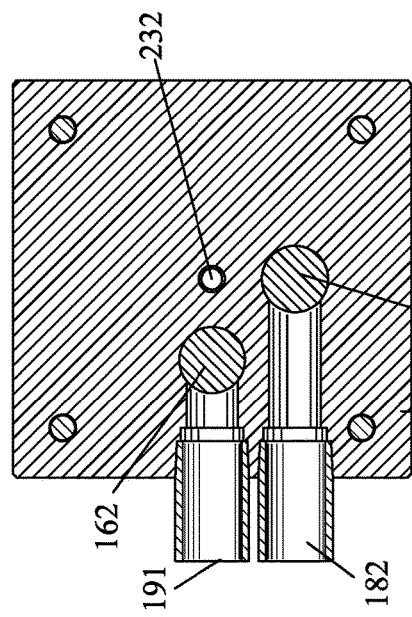
FIG. 8 is a sectional view along line 8-8 in FIG. 5.

Fluid pressure of the first fluid from supply line 212 is applied to move the shuttle valve 504, shown in FIG. 8, to the top position in FIG. 8. The position of the shuttle valve 114 enables the first fluid to enter the second engine input 81 to urge the engine piston 106 toward the left in FIG. 12. The position of the shuttle valve 504 enables the first fluid to exit from the first engine output 92 as the engine piston 106 moves toward the left in FIG. 12.

An engine section sensor 231 and an output section sensor 232 are located in the engine valve assembly 110 and the output valve assembly 160, respectively. The engine section sensor 231 and the output section sensor 232 sense the position of the engine piston 106 and the output piston 156. Connectors 233 and 234 connect the engine section sensor 231 and the output section sensor 232 to the logic board (not shown).

In operation, a heated first fluid is provided to the engine section input system 80 including the first engine input 81 and the second engine input 82. The shuttle valves 114 and 504 alternately direct the heated first fluid to opposite sides of the engine piston 106. The first fluid is discharged by the engine section output system 90 including the first and second engine outputs 91 and 92. The discharged first fluid is cooled by the engine condenser 45 thereby producing a differential in fluid temperature to power the heat engine 5A.

Reciprocal operations of the engine piston 106 results in reciprocal movement of the output piston 156. The second fluid is alternately discharged by the output section output system 180 including first and second output section outputs 181 and 182. The compressed second fluid is directed to the output condenser 52 for cooling the compressed second fluid. The compressed second fluid is passed to the metering device 185 to cool the evaporator 53.

FIGS. 7-10 are views of the heat engine 5A having an engine valve assembly 110, the first central valve assembly 500, the second valve assemble 550 and the output valve assembly 160 of the present invention.

FIG. 7 is a sectional view illustrating the engine valve assembly 110. The engine valve assembly 110 includes a valve bore 113 slidably receiving a shuttle valve 114. The shuttle valve 114 is substantially cylindrical having a region of reduced area defining a shuttle valve flow region 115. A threaded cap 116 retains the shuttle valve within the valve bore 113. The supply lines 211 and 221 communicate with opposite ends of the valve bore 113. A differential in fluid pressure between the supply lines 211 and 221 will move the shuttle valve 114 within the valve bore 113.

FIG. 8 is a sectional view illustrating the first central valve assembly 500. The first central valve assembly 500 includes a valve bore 503 slidably receiving a shuttle valve 504. The shuttle valve 504 is substantially cylindrical having a region of reduced area defining a shuttle valve flow region 505. Threaded caps 506 retain the shuttle valve 504 within the valve bore 503. The supply lines 212 and 222 communicate with opposite ends of the valve bore 503. A differential in fluid pressure between the supply lines 212 and 222 will move the shuttle valve 504 within the valve bore 503.

The shuttle valves 114 and 504 control fluid pressure of a first fluid directed to the engine section 100 of the heat engine 5A. The first fluid flows in the closed path between the engine section 100, the engine condenser 51, internal return pump 60, and the vapor generator 40. Control of the fluid pressure of the first fluid to the engine section 100 results in reciprocation of the engine piston 106 and the output piston 156 within the bores 105 and 155 respectively.

Figure 9:
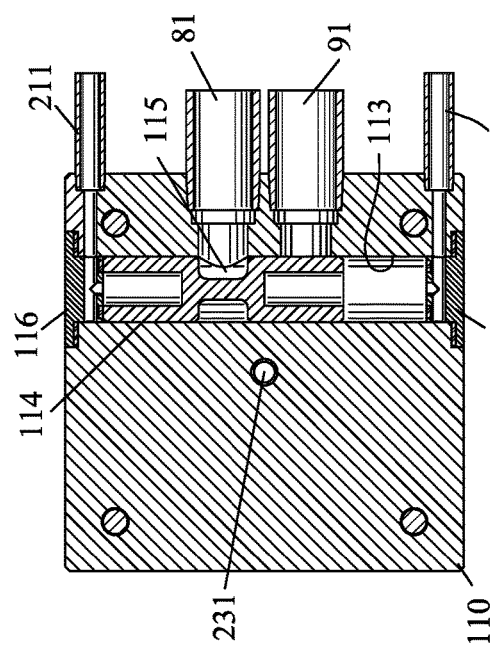
FIG. 9 is a sectional view along line 9-9 in FIG. 5.

FIG. 9 is a sectional view illustrating the second central valve assembly 550. The heat engine 5A utilizes check valves 552 and 553 and check valves 161 and 162 which are spring loaded check valves to control the fluid direction.

The check valve 553 is located in proximity to the first output section output 181 whereas the check valve 552 is located in proximity to the second output section input 192. The check valve 162 is located in proximity to the first output section input 191 whereas the check valve 161 is located in proximity to the second output section output 182.

Figure 10:
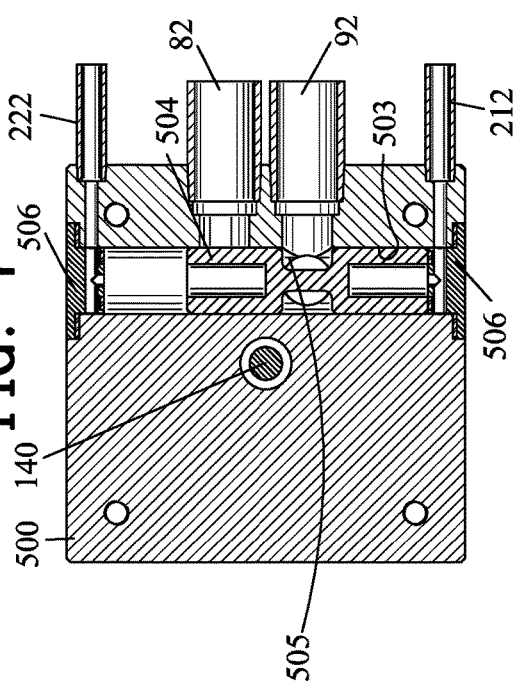
FIG. 10 is a sectional view along line 10-10 in FIG. 5.

FIG. 10 is a sectional view illustrating check valves 161 and 162 located within the output section valve assembly 160. The check valve 162 is located in proximity to the first output section input 191 whereas the check valve 161 is located in proximity to the second output section output 182.

A second fluid flows in a closed path between the output section 150, the output condenser 52 and the output evaporator 53. The check valve 507 and 508 in combination with the check valves 161 and 162 control the direction of flow of the second fluid in vapor form from the output section 150 of the heat engine 5A. The fluid flow of the second fluid from the output section 150 through the output condenser 52, the metering device 185 and the output evaporator 53 results in air conditioning or refrigeration of a desire space. The second fluid operates in accordance with the Carnot cycle as should be well known to those skilled in the art.

Figure 11:
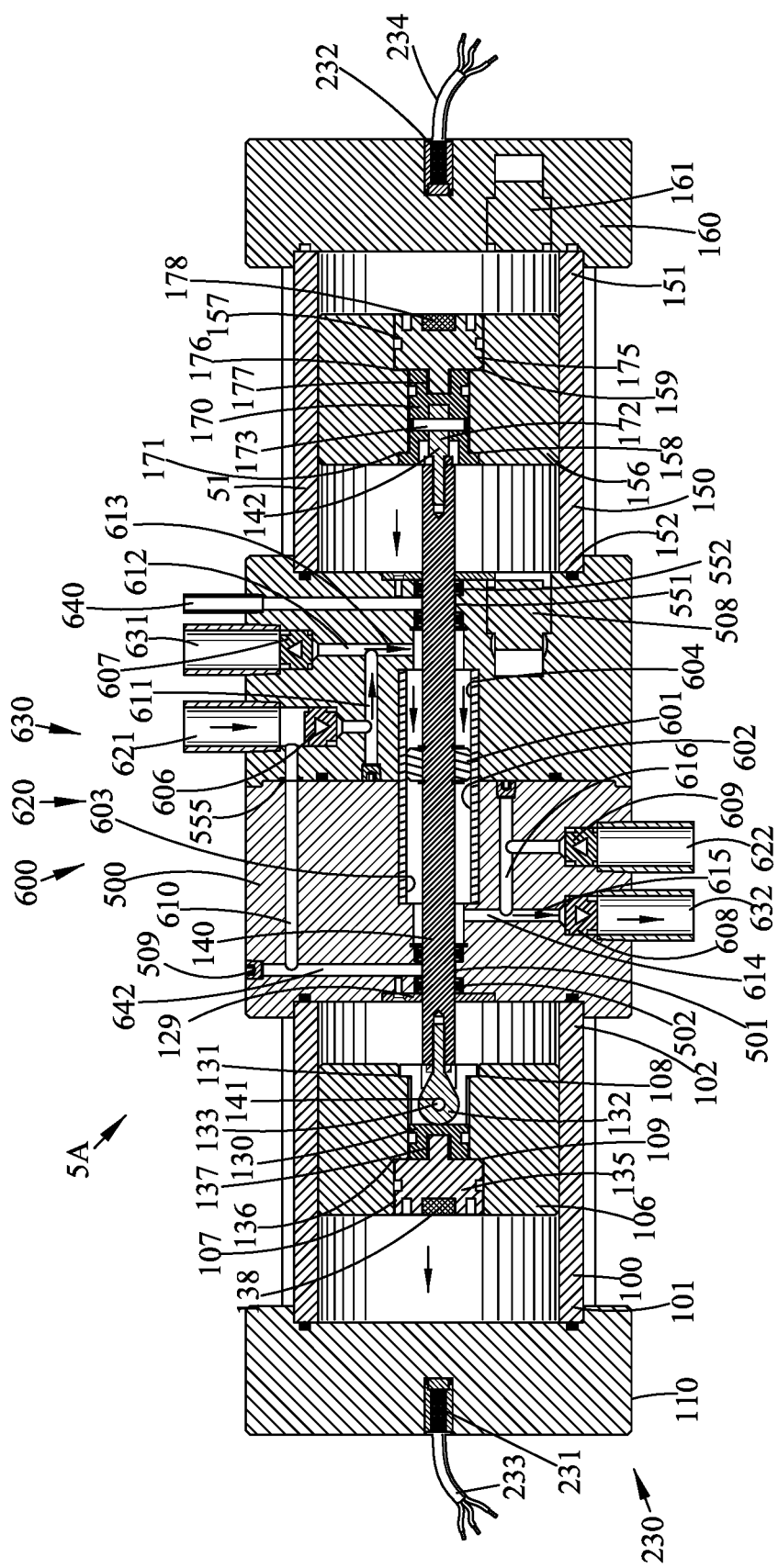
FIG. 11 is a sectional view similar to FIG. 6 with the heat engine located in a first position.
Figure 12:
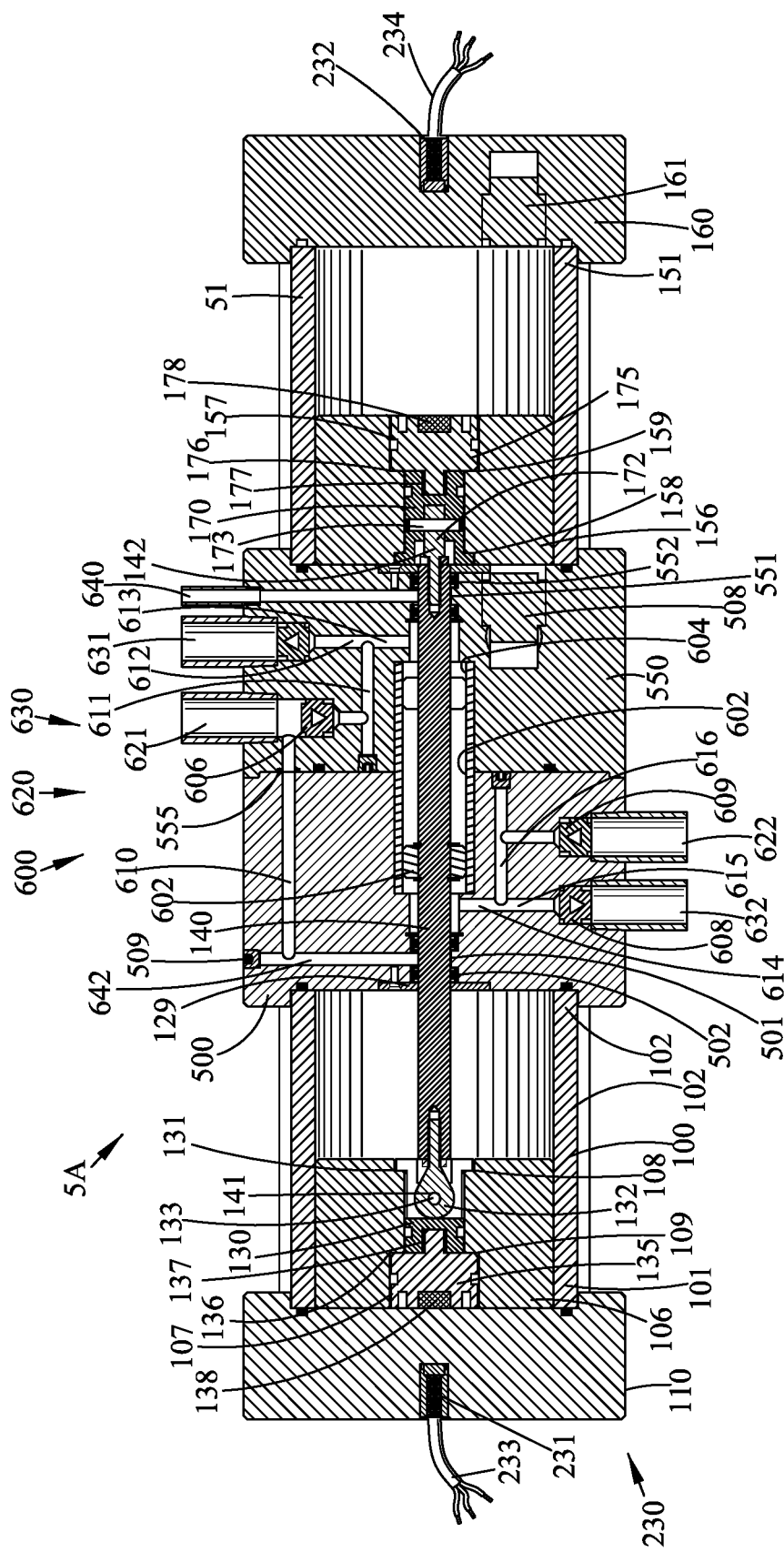
FIG. 12 is a sectional view similar to FIG. 6 with the heat engine located in a second position.
Figure 13:
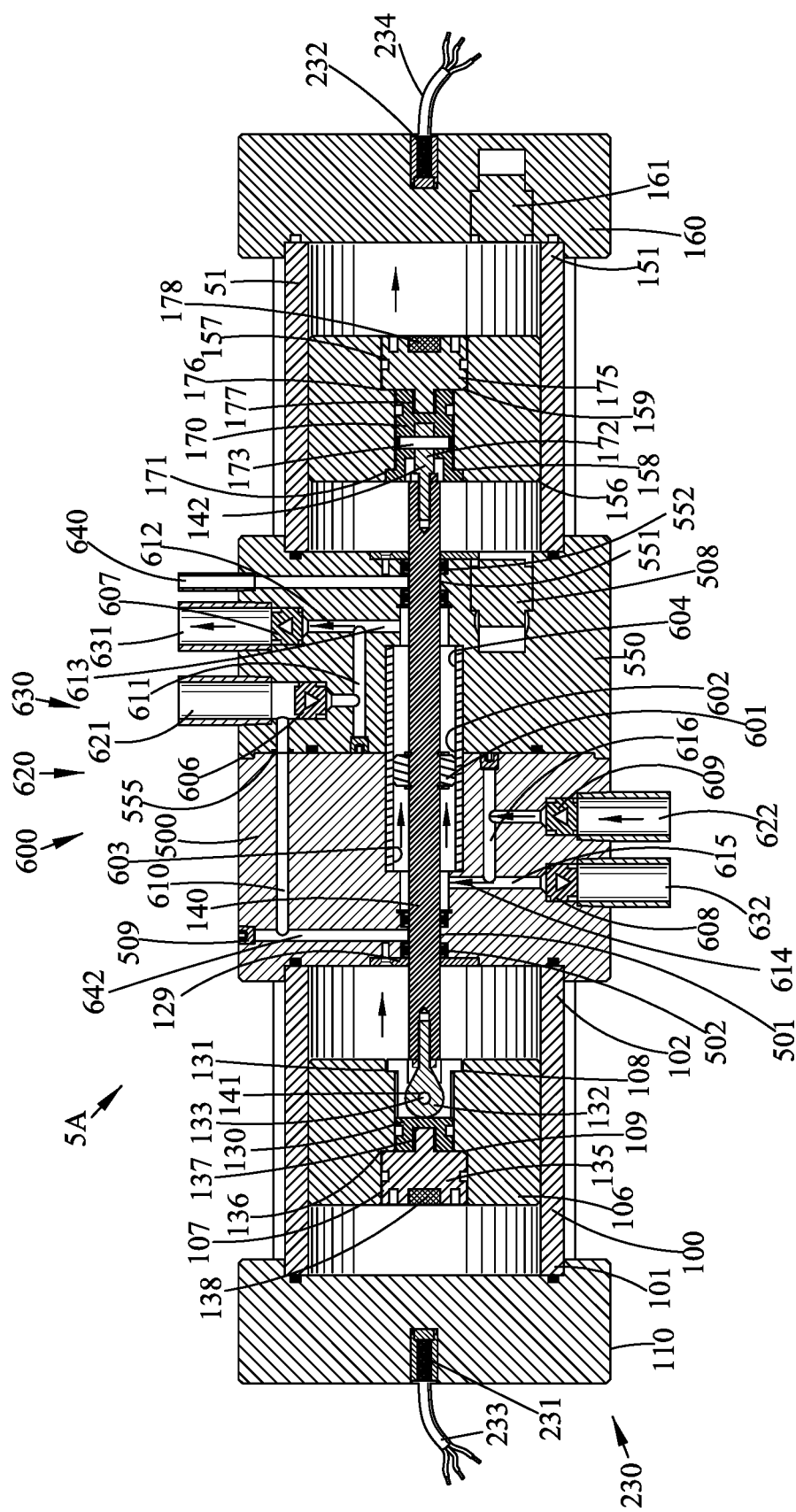
FIG. 13 is a sectional view similar to FIG. 6 with the heat engine located in a third position.

FIG. 11-13 are various views of the universal heat engine 5A of the present invention with the heat engine 5A located in a first, second and third position.

FIG. 11 is a sectional view illustrating check valves 606, 607, 608, and 609 located within the first central section valve assembly 500 and second central section valve assembly 550, respectively. The check valve 606 is located in proximity to the first condenser pump input 621 whereas the check valve 607 is located in proximity to the first condenser pump output 631. The check valve 608 is located in proximity to the second condenser pump output 632 whereas the check valve 609 is located in proximity to the second condenser pump input 622. FIG. 11 shows the engine piston 106, the output piston 156, and the pump piston 601 transitioning from the first position to the second position. FIG. 11 also shows fluid direction while the pistons are in transition. The first fluid flows into the second engine input 82 to move the engine piston 106 to the left in FIG. 11. Concomitantly therewith, the second fluid flows from the first output section output 181 through the check valve 508 to flow into the output condenser 52. The second fluid flows from the output evaporator 53 into the first output section input 191 through check valve 162.

FIG. 11 shows the heat engine 5A wherein the engine piston 106, the output piston 156 and the pump piston 601 in transition to the second position located to the left. In this example, the condenser piston pump 601 forces the second fluid to the left wherein the second fluid is forced through a series a veins 614 and 615 before discharging out the second condenser pump output 632. The second fluid is also drawn in the first condenser pump input 621 first through the check value 606 and through veins 611 and 613 before entering the condenser pump bore 602. During the time in which the engine piston 106, the output piston 156, and the pump piston 601 are transition to the third position as shown in FIG. 13. The second fluid drawn in during the transition to the second position will be forced out through vein 613 and 612 then through the first condenser pump output 631 check value 607.

FIG. 12 is similar to FIG. 11 wherein the engine piston 106, the output piston 156, and the pump piston 601 are located to the second position located at maximum left position. Shown in FIG. 12 are bleeder lines 641 and 642. These bleeder lines 641 and 642 capture any second fluid that seeps through one of the four seals 502 and returns it back into the second fluid system by vein 642 and 610 or through the bleeder port 640.

Fluid pressure of the first fluid from supply line 221 moves the shuttle valve 114 from the position shown in FIG. 7 to a bottom position. Fluid pressure of the first fluid from supply line 222 moves the shuttle valve 504 to the top position from the bottom position shown in FIG. 8. The position of the shuttle valve 114 enables the first fluid to enter the first engine input 81 to urge the engine piston 106 toward the right in FIG. 13. The position of the shuttle valve 504 enables the first fluid to exit from the second engine output 92 as the engine piston 106 moves toward the right in FIG. 13.

FIG. 13 shows the heat engine 5A wherein the engine piston 106, the output piston 156, and the pump piston 601 are in transition to the third position located to the right. In this example, the condenser pump piston 601 forces the second fluid to the right wherein the second fluid is forced out of the first condenser pump output 631 and drawn in through the second condenser pump input 622, through second condenser pump input check valve 609, through vein 616, through vein 614 and then into the condenser pump bore 602. The first fluid flows into the first engine input 81 to move the engine piston 106 to the right. The first fluid flows from the second engine output 632 as the engine piston 106 moves to the right.

Concomitantly therewith, the second fluid flows from the second output section output 182 through the check valve 161 to flow into the output condenser 52. The second fluid flows from the output evaporator 53 into the second output section input 192 through check valve 507.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An internal return pump for a heat engine converting energy from a vapor source to an output device, the vapor source having a high pressure vapor supply and a low pressure vapor return, comprising:

a heat engine section including, a heat engine body extending between a first and a second end and defining a heat engine bore therebetween;

a first and a second heat engine body end secured to said first and a second end of said heat engine body or sealing opposed ends of said heat engine bore:

a heat engine piston located in said heat engine bore;

a heat engine piston rod connected to said heat engine piston;

a first valve and a second valve assembly communicating with said heat engine bore for reciprocating said heat engine piston within said heat engine bore;

a condensate pump operated by said heat engine piston rod for pumping low pressure vapor to the low pressure vapor return of the vapor source;

said condensate pump has an input vein for channeling low pressure vapor from said first and second valve assemblies into said condensate pump;

an output vein for channeling vapors from said condensate pump to the low pressure vapor return of the vapor source;

an output section including, said heat engine piston rod extending through said second heat engine body end for connection to the output device.

2. The internal return pump for a heat engine as set forth in claim 1, wherein said condensate pump includes a condensate pump bore extending between a first and a second condensate pump bore end; and said condensate pump bore being located proximate said second heat engine body end.

3. The internal return pump for a heat engine as set forth in claim 1, wherein said condensate pump includes a condensate pump bore extending between a first and a second condensate pump bore end; and said condensate pump bore being located within said second heat engine body end.

4. The internal return pump for a heat engine as set forth in claim 1, wherein said condensate pump includes a condensate pump piston located in a condensate pump bore;

said condensate pump piston being connected to said heat engine piston rod for reciprocating said condensate pump piston within said condensate pump bore upon reciprocation of said heat engine piston rod.

5. The internal return pump for a heat engine as set forth in claim 1, wherein said heat engine piston rod extends through a condensate pump bore of said condensate pump located between said second heat engine body end and output section.

6. The internal return pump for a heat engine as set forth in claim 1, wherein said output section comprises an output compressor for providing a second differential in temperature and pressure of a second fluid.

7. The internal return pump for a heat engine as set forth in claim 1, wherein said output section comprises an air conditioning system.

8. An internal return pump for a heat engine converting energy from a vapor source to an output device, the vapor source having a high pressure vapor supply and a low pressure vapor return, comprising:

a heat engine section including, a heat engine body extending between a first and a second end and defining a heat engine bore therebetween;

a first and a second heat engine body end secured to said first and a second end of said heat engine body or sealing opposed ends of said heat engine bore;

a heat engine piston located in said heat engine bore;

a heat engine piston rod connected to said heat engine piston;

a first valve and a second valve assembly communicating with said heat engine bore for reciprocating said heat engine piston within said heat engine bore;

a condensate pump operated by said heat engine piston rod for pumping low pressure vapor to the low pressure vapor return of the vapor source;

said condensate pump has an input vein for channeling low pressure vapor from said first and second valve assemblies into said condensate pump;

an output vein for channeling vapors from said pump to the low pressure vapor return of the vapor source;

an input and an output check-valve disposed in said input vein and said output vein for controlling direction of pressure vapors from said first and second valve assemblies to the low pressure vapor return of the vapor source;

an output section including, said heat engine piston rod extending through said second heat engine body end for connection to the output device.

* * * * *